Feb. 8, 1949. T. P. FLYNN ET AL 2,461,150
ENDLESS TRACK
Original Filed June 15, 1944
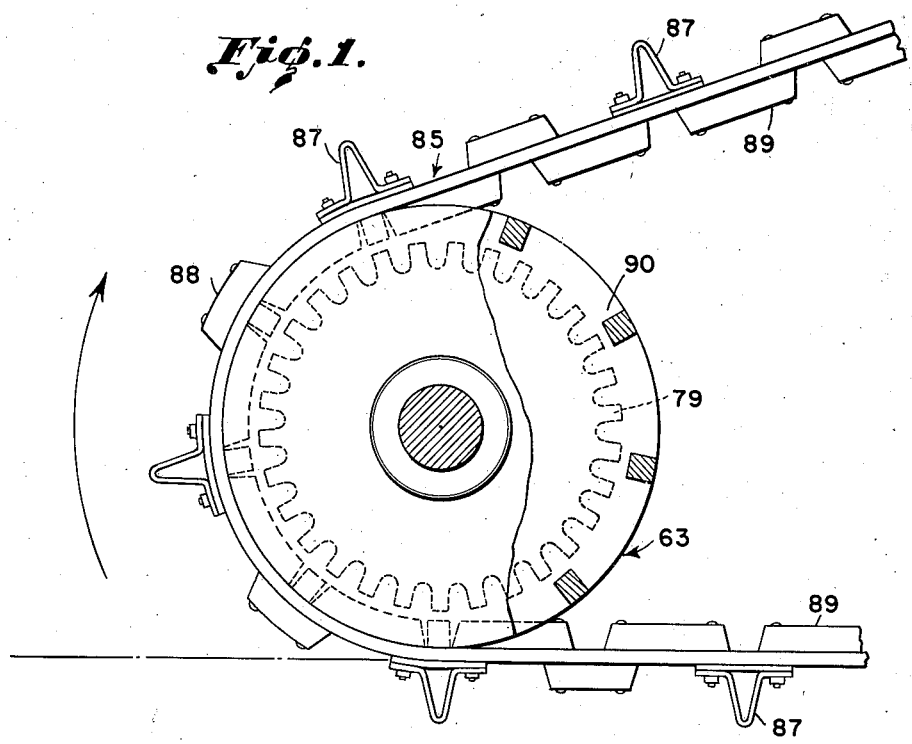
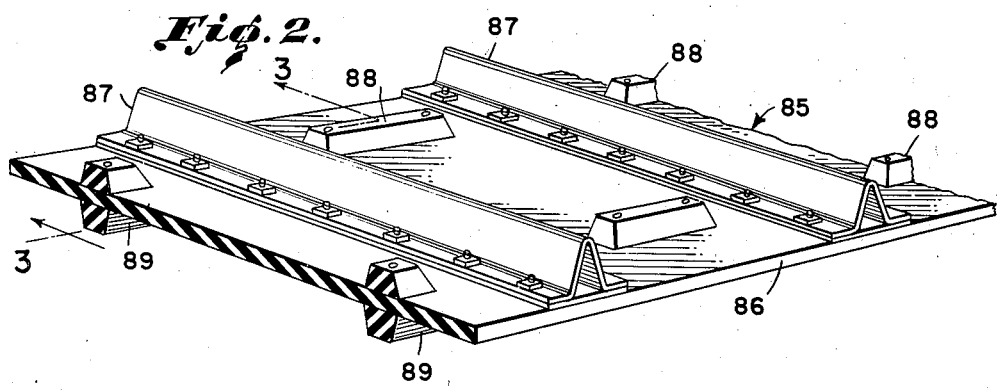
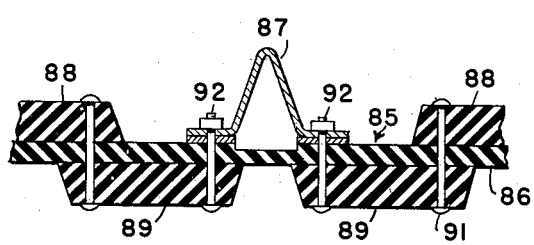
Inventors
T. P. FLYNN
T. COLDWELL
By J. A. Seagrist
ATTORNEYS Patented Feb. 8, 1949

2,461,150

UNITED STATES PATENT OFFICE 2,461,150

ENDLESS TRACK

Theodore P. Flynn, Portland, Oreg., and Thomas Coldwell, Vancouver, Wash.; dedicated to the free use of the People in the territory of the United States Original application June 15, 1944, Serial No. 540,510. Divided and this application May 28, 1946, Serial No. 672,902

2 Claims. (Cl. 305—10)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This application is a division of our copending application for patent, Serial No. 540,510, filed June 15, 1944, now abandoned.

We hereby dedicate the invention herein described to the free use of the People in the territory of the United States to take effect on the granting of a patent to us.

This invention relates to a tractor having a pair of endless side tracks, primarily useful in traveling over snow, and has among its objects: the improvement in details of the endless track and such other objects as will be apparent from the following detailed description, appended claims and accompanying drawing.

In the drawing,

Figure 1 is a detail showing of the track and its association with the driving drum of a tractor;

Figure 2 is a three-dimensional view of a portion of the track showing the snow-engaging surface; and Figure 3 is a section on the line 3—3 of Figure 2.

Referring to the drawing, the tractor is provided with a driving drum 63 driven by sprocket 79 and mounted at the rear in the usual manner. The flexible track 85 is of special design with primary emphasis on features rendering it well suited for snow tractor use. Preferably, it is formed from a belt 86 of reinforced rubber, provided with transversely extending rigid grousers or lugs 87 and longitudinally extending side skid lugs 88 on its outer surface. The grousers may be formed of folded metal, as illustrated, and are extended the full width of the belt, thus rendering the belt rigid in its transverse direction. The side skid lugs are preferably formed of rubber or similar material, thus to be longitudinally flexible. The particular track shown is provided with two longitudinally extending rows of spaced side skid lugs, but any number may be provided, depending on the width of the track employed. These side skid lugs are especially useful, since tractors of this type are frequently used on quite steep side hills, and without side skid lugs the tractor tends to skate or slide sidewise down the hill. The side skid lugs are of less elevation than the grousers to prevent their interference with efficient penetration of the grousers, and to prevent undue interference with turning of the tractor.

The inner surface of the track is provided with two longitudinally extending rows of spaced drive lugs 89. The arrangement is such that the lugs on each surface lie opposite the spaces between the lugs on the other surface with the longitudinal extremities of the lugs on one surface overlapping those on the other. Lugs 89 are also preferably formed of rubber to render them longitudinally flexible, and they mate loosely into pockets 90 in the driving drum to prevent slipping of the driving drum inside the track.

Referring particularly to Figure 3, the manner of securing the grousers 87, side skid lugs 88, and driving lugs 89 to the belt 86 is shown, each being secured at its longitudinal extremities to another one on the opposite side of the belt, as by means of rivets 91 and bolts 92 extending through the belt and the overlapping extremities of the grousers and lugs. This manner of securement removes much of the strain from the belt, thus increasing its wearing qualities and ability to perform its required task, since the grousers and lugs form a continuous bridge extending lengthwise of the belt through which the forces tending to tear these parts from the belt are transmitted.

Having thus described the invention, what is claimed is:

1. A track for a snow tractor of the class described, comprising an endless belt of flexible material, at least one longitudinally extending row of spaced drive lugs on the inner surface of the belt and at least one longitudinally extending row of spaced lugs on the outer surface of the belt so arranged that the lugs on each surface lie opposite the spaces between the lugs on the other surface, the longitudinal extremities of the lugs on one surface overlapping those on the other, and securing means extending through the belt and the overlapping extremities for securing the lugs to each other and to the belt.

2. A track for a snow tractor of the class described, comprising an endless belt of flexible material, at least one longitudinally extending row of spaced drive lugs on the inner surface of the belt, at least one longitudinally extending row of spaced side skid lugs and transversely extending spaced grousers on the outer surface of the belt so arranged that the lugs on the inner surface lie opposite the spaces between the lugs and grousers on the outer surface, the extremities of the drive lugs overlapping the extremities of the side skid lugs and grousers, and securing means extending through the belt and the overlapping extremities for securing the drive lugs to the side skid lugs and grousers and securing the lugs and grousers to the belt.

THEODORE P. FLYNN.
THOMAS COLDWELL.

REFERENCES CITED

The following references are of record in the file of this patent:

UNITED STATES PATENTS

| Number | Name | Date |
|---|---|---|
| 1,307,092 | Fuchs | June 17, 1919 |
| 1,400,100 | Reddaway | Dec. 13, 1921 |
| 1,790,098 | Kegresse | Jan. 27, 1931 |

FOREIGN PATENTS

| Number | Country | Date |
|---|---|---|
| 134,190 | Great Britain | Nov. 13, 1919 |